Patented Aug. 14, 1923.

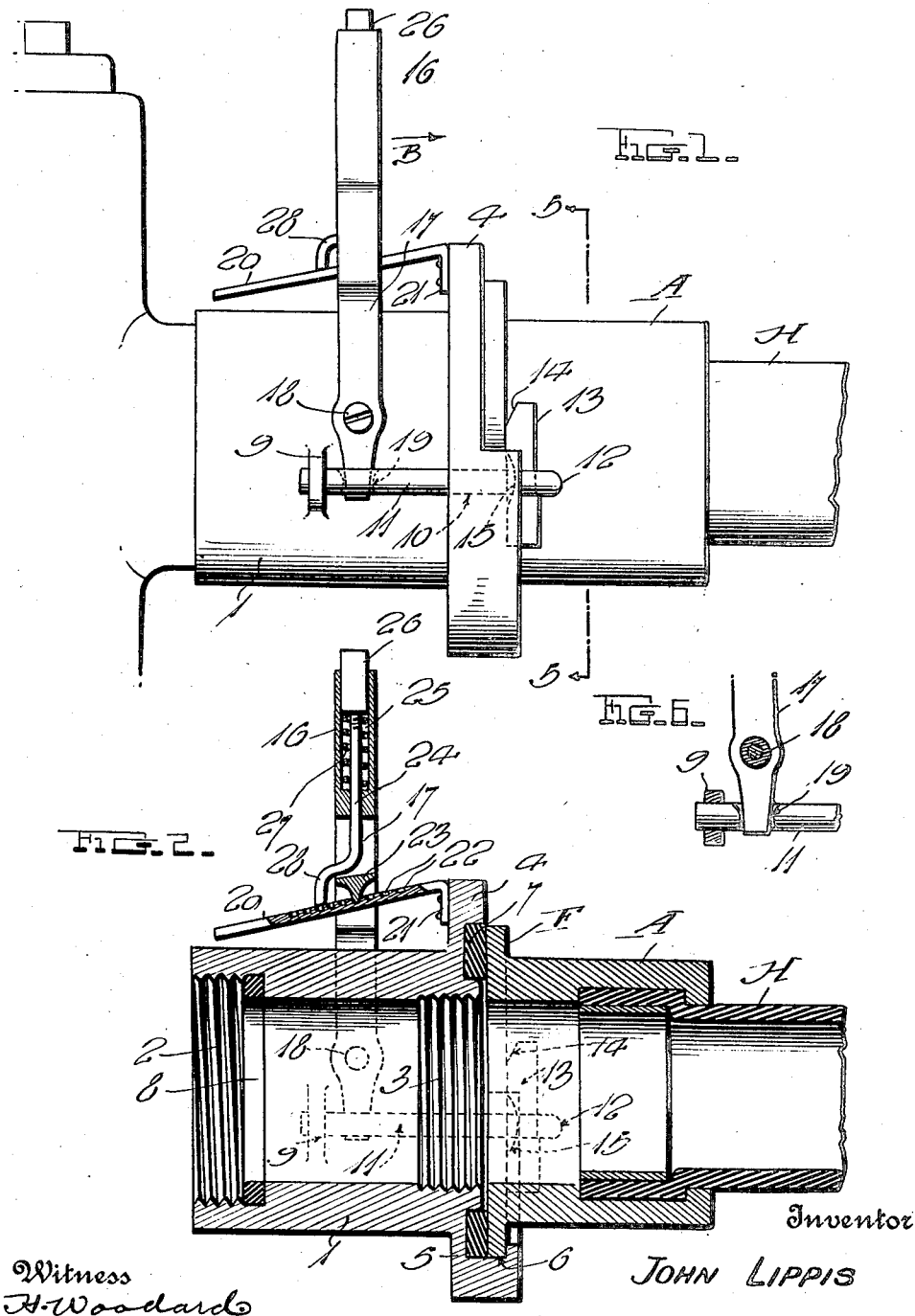

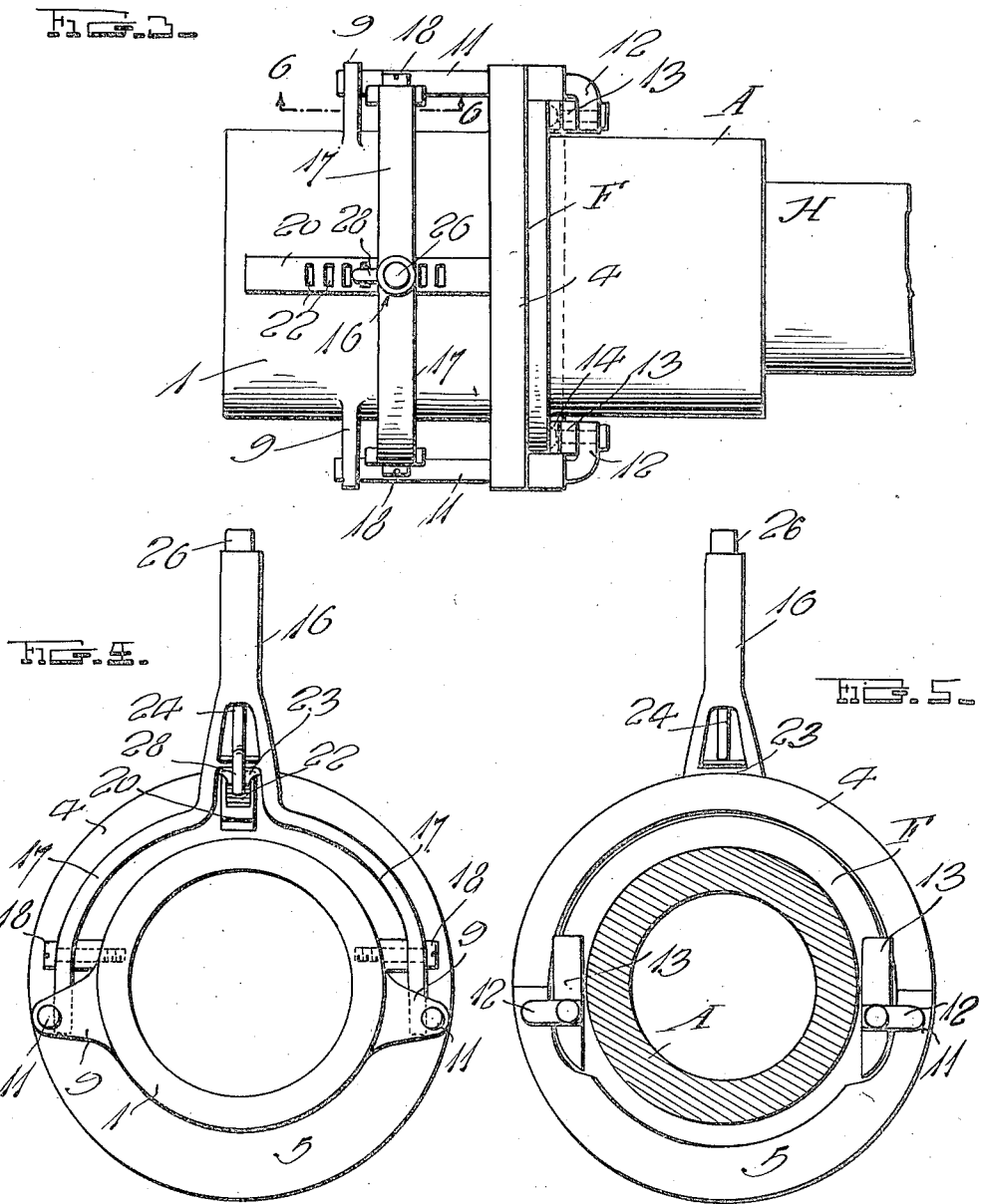

1,464,768

UNITED STATES PATENT OFFICE.

JOHN LIPPIS, OF CANON CITY, COLORADO, ASSIGNOR OF ONE-HALF TO JOHN P. THOMAS, JR., OF CANON CITY, COLORADO.

COUPLING FOR PIPES.

Application filed September 22, 1921. Serial No. 502,436.

*To all whom it may concern:*

Be it known that I, JOHN LIPPIS, a citizen of the United States, residing at Canon City, in the county of Fremont and State of Colorado, have invented certain new and useful Improvements in Couplings for Pipes; and I do declare the following to be a full, clear, and exact description of the invention, such as will enable others skilled in the art to which it appertains to make and use the same.

This invention relates to an improved coupling designed for connecting pipes, hose, and the like together.

The principal object of the invention is to generally improve upon devices of this class by providing one of extreme simplicity and durability, which is composed of extremely few inexpensive parts, making it practical and comparatively inexpensive to both the manufacturer and the user.

Other objects and advantages of the invention will be apparent during the course of the following description.

In the accompanying drawings forming a part of this specification and in which like numerals are employed to designate like parts throughout the same:

Figure 1 is a side elevational view of a pipe coupling constructed in accordance with this invention.

Figure 2 is a central longitudinal vertical sectional view through the coupling.

Figure 3 is a top plan view thereof.

Figure 4 is a view looking toward the left-hand end of the coupling.

Figure 5 is a sectional view taken substantially on the plane of the line 5—5 of Fig. 1.

Figure 6 is a detail section taken substantially on the plane of the line 6—6 of Fig. 3.

Referring to the drawings by numerals, it will be seen that the improved coupling comprises a tubular member 1 provided at its outer end with internal screw-threads 2 to permit it to be connected to a hydrant or the like, and at its opposite ends with screw-threads 3 to permit a cap or plug to be connected therewith when the hose H is uncoupled. This member 1 is provided at the last named end with a lateral flange 4 which is increased in thickness as indicated at 5. It will be seen that this widened portion of the flange extends approximately through one-half of the diameter and is recessed as indicated at 6 for reception of the flange F of the coupling head A of the aforesaid hose. The flange 4 is additionally grooved to provide a seat for the packing ring 7 which serves to provide a fluid-tight connection between the hose and coupling member 1. A packing ring 8 is also arranged at the opposite end of the last named member to provide a fluid-tight connection between this member and the pipe or hydrant to which it is connected.

At approximately diametrically opposite points, the member 1 is equipped with integral ears 9 and these ears are formed with guide openings which are disposed in longitudinal alinement with other guide openings 10 formed in the widened portion 5 of the flange 4, and pins 11 or the like are slidably mounted in these openings. By referring to Figs. 3 and 5, it will be seen that the outer ends of these pins 11 are bent laterally inward toward each other as indicated at 12 and these laterally bent ends carry clamping blocks 13 which are designed to bear against the flange F for affecting a coupling. While on these blocks, I may direct attention to the fact that the inner faces of the upper end thereof are bevelled as indicated at 14 to facilitate insertion of the flange F into the recessed portion 6 of the co-acting flange on the member 1. I might also point out that the inner faces of these blocks are recessed between their ends as indicated at 15 to insure effective contact thereof with the flange F. It is obvious that with this construction, when the pins 11 are moved toward the left, the clamping blocks 13 serve to bind the flange of the hose coupling head tightly against the packing 7. On the other hand, when the pins are moved in an opposite direction, the blocks are moved away from the flange F to permit the parts to be uncoupled.

For the purpose of imparting the aforesaid movement to the slide-pins 11, I make use of a lever 16 having its lower end forked, the arms 17 of this fork being fulcrumed on opposite sides of the part 1 as indicated at the points 18. The ends of the arms 17 extend beyond the pivot points and are received in slots 19 formed in the aforesaid pins. Consequently, it will be seen that by grasping the lever and rocking it in one direction or the other, a sliding movement will be imparted to the pins.

It is desirable to provide means for locking the lever 16 in various adjusted positions and while this means could be constructed otherwise, it preferably consists of a flat spring 20 which is secured at one end to the aforesaid flange 4 as indicated at 21. This spring is formed in its upper face with a plurality of closely spaced depressions 22 and a rigid projection or locking finger 23 carried by the arms of the forked lever is designed to be received in these depressions for maintaining the lever in its various adjusted positions. In order to disengage the part 23 from the spring, it is necessary to depress the free end of the latter and while this result may be accomplished by pressing downwardly with the hand, I desire to provide mechanical means for accomplishing this end. The means just referred to preferably consists of a plunger 24 carried by the lever, the same being slidably mounted in a socket 25 formed in the upper end of the latter and including a finger-piece 26 which projects above the adjacent end of the lever so as to enable it to be depressed for forcing downwardly on the spring 20. A coiled spring 27 is arranged in the socket 25 and serves to normally hold the plunger in inoperative position. The lower end of the latter is angularly bent as indicated at 28 to permit it to bear effectively on the upper side of the aforesaid spring.

In use, the flange F of the coupling head A is engaged with the beveled surfaces 14 of the clamping blocks 13 and is forced downwardly and seated in the recessed portion 6 of the widened part 5. Now, the lever 16 is grasped and moved in the direction of the arrow B. Of course, to permit such movement of the lever, it will be necessary to press downwardly on the plunger 24 so as to disengage the finger 23 from the locking spring 20 and it will be necessary to hold said plunger in this depressed state until the desired clamping action is obtained. Such movement of the lever, of course, imparts a sliding movement to the pins 11 and since the latter carry the blocks 13, these are brought into tight engagement with the flange F, binding the latter tightly against the gasket or packing ring 7 and providing the desired leak-proof coupling. After the desired clamping action is obtained, the plunger is released and the spring 20 moves upward until the finger 23 becomes engaged with the proper depression. To uncouple the parts, it is only necessary to reverse the operation just described.

By carefully considering the description in connection with the drawings, persons familiar with devices of this class will doubtless be able to obtain a clear understanding of the invention. Therefore, a more lengthy and detailed description is deemed unnecessary.

Since probably the best results may be obtained with the construction and arrangement herein shown and described, this is taken as the preferred embodiment of the invention. However, I wish it to be understood that minor changes coming within the scope of the invention as claimed may be resorted to if desired.

I claim:

1. A coupling of the class described comprising a pair of slides having clamping blocks on one of their ends, a pivoted lever having direct connection with said slides for actuating the latter, and automatically operable means for engaging a part of the lever and retaining the same in various positions to which it has been moved.

2. The structure set forth in claim 1 wherein manually operable means is carried by the lever for cooperation with the retaining means for disengaging the latter from the lever.

3. A coupling comprising a pair of slidably mounted pins provided intermediate their ends with slots, one of the ends of each of the pins being directed laterally inward, clamping blocks secured to said laterally directed ends, said blocks being designed for engagement with one of the flanges of a pipe, a forked operating lever, the arms thereof being designed to be pivotally connected intermediate their ends with said pipe, the lower ends of the arms being received in the aforesaid slots for imparting sliding movement to the pins when the lever is rocked, and coacting means between the lever and the pipe for holding the lever in various adjusted positions.

4. A coupling comprising a substantially tubular member provided at one end with a lateral flange, clamping members slidably mounted on opposite sides of said first named member, said clamping members being designed to bind the flange of a coupling head against said first named flange, a forked lever, the arms of the fork being pivoted on said tubular member, a locking spring connected with the flange of said last named member and extending between the arms of said fork, said spring being formed in its upper face with a plurality of closely spaced depressions, and a finger carried by the arms of said fork, being designed for reception in said depressions for retaining the lever in various adjusted positions.

5. A coupling comprising a pair of slidably mounted clamping members, a pivotally mounted lever acting on said members for moving them, a locking spring strip associated with the lever, said strip having depressions in its upper face, a finger carried by said lever and receivable selectively in the depression, and a spring pressed plunger carried by said lever and engageable with the spring strip for forcing downwardly to disengage it from the finger to permit movement of the lever in one direction.

6. A coupling of the type specified comprising a pair of oppositely disposed slidably mounted pins having clamping blocks on one end for cooperation with the flange on a pipe, a forked lever having the arms of the fork pivoted, the lower ends of said fork arms being engaged with said pins for imparting sliding movement thereto, a spring strip extending between the arms of said lever, said strip having depressions formed in its upper face, a finger carried by the lever and selectively received in the depressions, and a spring-pressed plunger carried by the lever and engageable with said strip for forcing it downwardly to disengage it from said finger to permit free movement of the lever in one direction.

In testimony whereof I have hereunto set my hand.

JOHN LIPPIS.